March 29, 1966 J. B. SNOY ET AL 3,243,026
HYDRAULIC CLUTCH WITH MULTIPLE PISTONS
Filed May 28, 1964 4 Sheets-Sheet 1

INVENTORS.
JOSEPH B. SNOY
JAMES B. BLACK
CONRAD R. HILPERT
BY
James E. Nilles
ATTORNEY

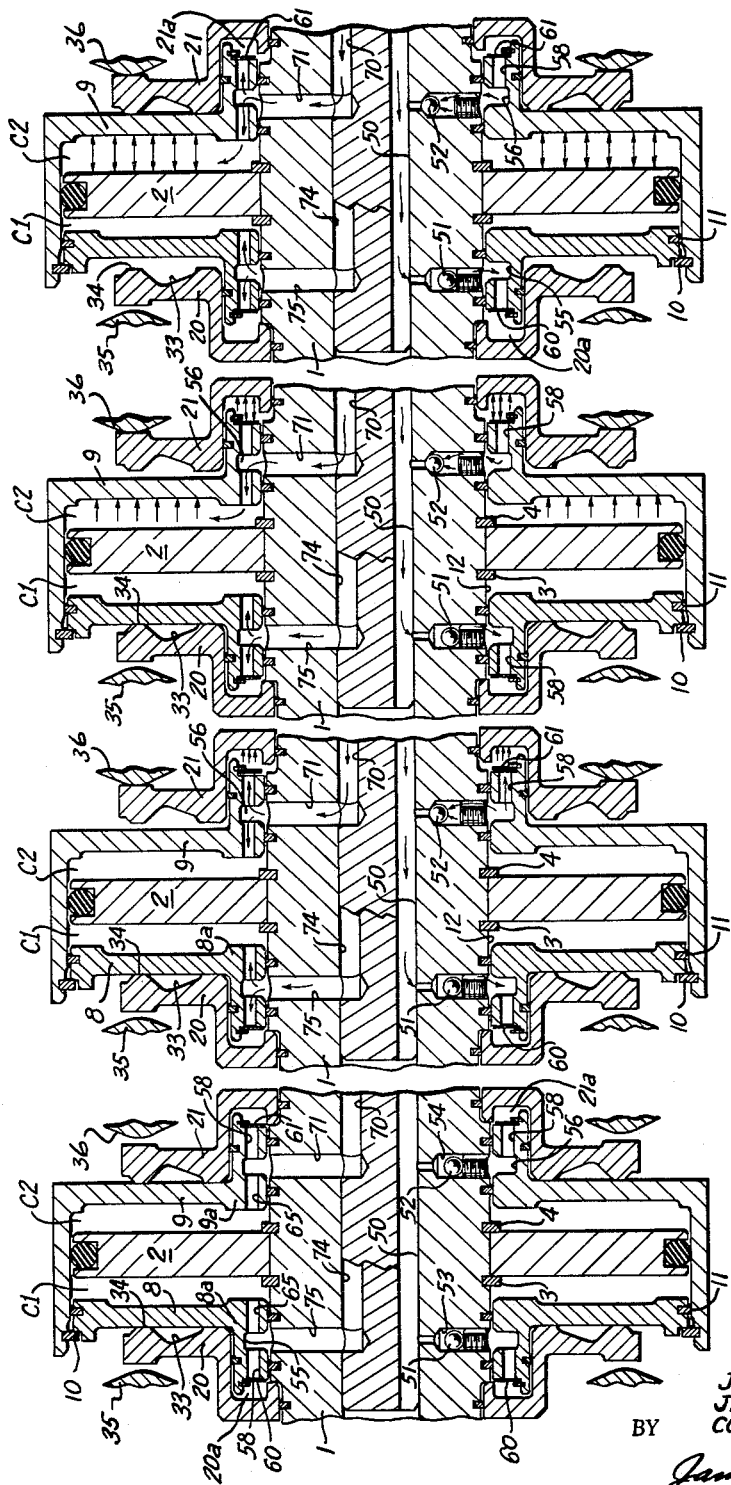

March 29, 1966 J. B. SNOY ET AL 3,243,026
HYDRAULIC CLUTCH WITH MULTIPLE PISTONS
Filed May 28, 1964 4 Sheets-Sheet 3

INVENTORS.
JOSEPH B. SNOY
JAMES B. BLACK
CONRAD R. HILPERT
BY
James E. Niller
ATTORNEY INVENTORS.
JOSEPH B. SNOY
JAMES B. BLACK
CONRAD R. HILPERT
BY James E. Nilles
ATTORNEY 3,243,026
HYDRAULIC CLUTCH WITH MULTIPLE PISTONS
Joseph B. Snoy, Conrad R. Hilpert, and James B. Black, Rockford, Ill., assignors to Twin Disc Clutch Company, Racine, Wis., a corporation of Wisconsin
Filed May 28, 1964, Ser. No. 371,000
19 Claims. (Cl. 192—87)

This invention relates generally to hydraulically operated clutch mechanism and finds particular but not exclusive utility in clutch mechanisms of the type having a pair of opposed clutches coaxially mounted on a rotating shaft, wherein the clutches are selectively engaged to provide drive through associated gearing or the like.

Prior art devices of the above type use opposed clutch packs having interleaved clutch plates which are operable by a piston disposed between the clutch packs. That piston is hydraulically operated and requires complicated and expensive parts and valving arrangements to effect rapid clutch operation. In devices of the above type, two opposed piston actuating chambers are both maintained full of the hydraulic fluid at all times so as to insure immediate and rapid actuation of the mechanism selectively in either direction, and the fluid is transferred from one chamber to the other in order to accomplish this rapid actuation.

In this manner, the oil volume requirement from the pressure supply system is held to a minimum in order to obtain this fast action, and as an example of this type of prior art device, reference may be had to U.S. Patent No. 3,106,999, issued October 15, 1963, entitled "Hydraulically Operated Clutch Mechanism," or U.S. Patent No. 2,920,732, issued January 12, 1960, entitled "Double Hydraulic Operated Clutch Device." In the device of either one of the said patents, the oil volume requirements for actuation are reduced, as previously mentioned, by providing for fluid transfer from the contracting chamber to the expanding or actuating chamber, and it is not necessary to supply sufficient fluid immediately to move a large area piston, through its full stroke to effect clutch engagement.

While the above devices operate satisfactorily in most respects, they do have certain shortcomings, for example, they require rather complicated parts which are expensive to manufacture and the various elements of the fluid transfer valves are subject to malfunction due to foreign matter in the fluid, among other reasons. Also in some of these prior devices, fluid flow to the main piston chamber was through and dependent on an orifice which could be adjusted for smooth engagement, but that required the orifice size to be in delicate balance with the elasticity of the various parts, such as, fluid compressibility, variable leakage, variable viscosity, and deflection of structural members. In addition, in these prior devices the initial and large clutch clamping force of the large area piston often resulted in an engagement which was quite violent and not "soft" or smooth.

Accordingly, the present invention provides an improved hydraulic operated, double clutch mechanism of the opposed and connected main piston type having axially spaced apart end walls; each clutch of the mechanism has a small volume primary piston mounted on the shaft of the mechanism, and which piston functions initially to abut against its clutch pack and take up the friction plate running clearance, and a large area piston which then provides the clamping force; the small pistons are mounted one at each side of the main piston and in engagement therewith to form a pair of small fluid chambers with said main piston and shaft. A particularly efficient, reliable, and stable clutch is thereby provided in which the parts do not wobble or tilt, and a smoothly operated clutch is thereby provided.

Another aspect of the present invention relates to the particular shaped and sized fluid passages in the hub of the main piston end wall, which passages distribute the fluid in an orderly and efficient manner to the small chamber to cause expansion thereof and then to its corresponding large chamber for application of clutch apply force. These same passages are utilized to keep all chambers charged with fluid of a relatively low pressure.

Yet another aspect of the invention relates to a hydraulic, double clutch mechanism of the large, annular, main piston type having opposite main chambers, and which main piston has a smaller piston at either side to define a small or initial actuating chamber therewith; the chambers are positively and constantly kept full of relatively low pressure fluid by a separate lubricating fluid passage which has check valve means for insuring the chambers are maintained full; and separate high pressure fluid passage means provide the actuating pressure fluid for both the small and large chambers.

Another more limited aspect of the invention relates to the particularly shaped primary, small piston which provides maximum deflection within allowable stress limits and results in a gradual build up of the clutch engaging force, and consequently smooth engagement of the clutch.

Generally, the present invention provides a hydraulic dual clutch which is reliable, fast in operation, economical to manufacture, smooth in operation, and requires no transfer of fluid from one of the main actuating chambers to the other.

The present invention also provides an improved hydraulic operated, clutch mechanism having a small volume primary piston mounted on the shaft of the mechanism, and which piston functions initially to abut against the clutch pack and take up the friction plate running clearance, and a large area piston which then provides the clamping force; the small piston is mounted at the side of the main piston and in engagement therewith to form a small fluid chamber with said main piston and shaft.

The invention also provides a hydraulic clutch mechanism having a large, annular, main piston having a main chamber and a smaller piston at its side to define a small or initial actuating chamber with the main piston; the chambers are positively and constantly kept full of relatively low pressure fluid by a separate lubricating fluid passage which has check valve means for insuring the chambers are maintained full; and separate high pressure fluid passage means provide the actuating pressure fluid for both the small and large chambers.

These and other objects and advantages of the present invention will appear hereinafter as this disclosure progresses, reference being had to the accompanying drawings, in which:

FIGURE 2 is a fragmentary view of the device shown in FIGURE 1, but on a smaller scale, showing the disengaged or neutral position of the device, FIGURE 3 is a view similar to FIGURE 2 but showing the initial engaging position of the device;

FIGURE 4 is a view similar to FIGURE 3 but showing the secondary engaging position of the device;

FIGURE 5 is a view similar to FIGURE 4 but showing the fully engaged position of the device;

FIGURES 1 TO 5

Figure 1:
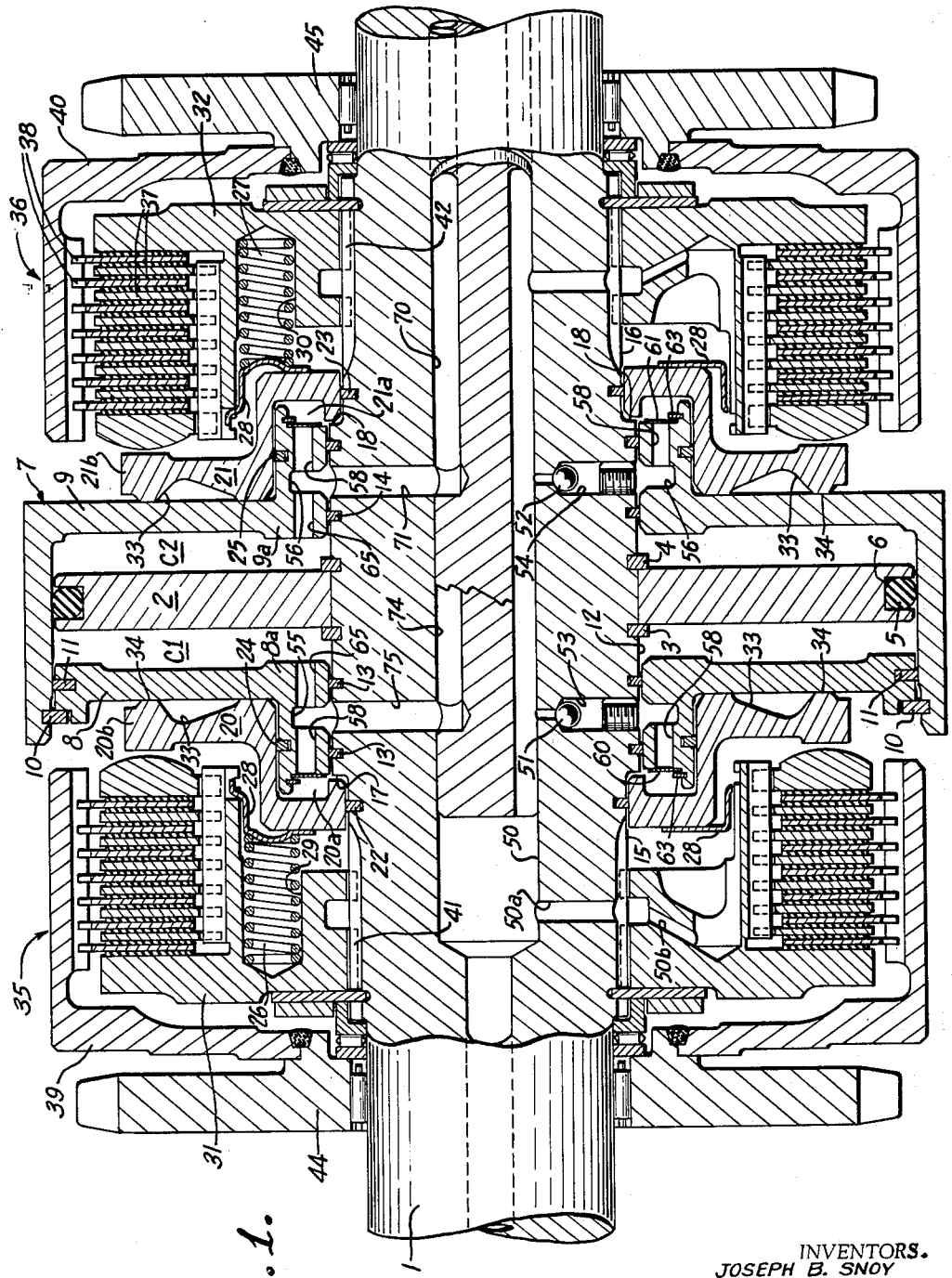
FIGURE 1 is a longitudinal view, partially in section and with parts broken away or removed for clarity, of a clutch device embodying the present invention.

Referring in greater detail to the drawings, the clutch device shown in FIGURE 1 is in the neutral or disengaged position. A shaft 1 which may be driven from a power source (not shown) has an annular reaction member 2 axially fixed thereon by snap rings 3 and 4 and rotatable with the shaft.

A sealing ring 5 is disposed in the groove 6 around the periphery of member 2 and sealingly engages the inner surface of an annular casing which forms a generally annular force piston 7. The reaction member divides the interior of the force piston into a pair of axially spaced fluid chambers C1 and C2.

MAIN PISTON

The main force piston 7 at one side has an end wall 8 which terminates at its central portion in an axially extending hub 8a. A similar end wall 9 and its hub 9a are located on the other side of the main force piston 7. For manufacture and assembly purposes, wall 8 is formed separately and held in assembled relationship by snap ring 10, and a fluid seal 11 is provided between wall 8 and the interior of the main force piston. In operation, the entire main piston may be considered as a unitary construction.

The axially extending hubs 8a and 9a are adapted to reciprocate over the central portion 12 of the shaft and are in sealing relationship with it by means of the conventional seals 13 and 14, respectively.

The shaft 1 has diametrically reduced portions 15 and 16, one on each side of the central portion 12, and radial shoulders 17 and 18 on the shaft form the junction between shaft portions 12 and portions 15 and 16, respectively.

PRIMARY PISTONS

A pair of primary or smaller pistons 20, 21 are axially slidable on shaft portions 15 and 16, respectively, and are in fluid sealing engagement therewith by means of the seals 22 and 23. As the pistons 20 and 21 are identical in construction, a description of one is deemed to be sufficient.

Formed within the central portion of each of the small primary pistons 20, 21 is a fluid chamber 20a, 21a, respectively, in which the hubs 8a and 9a slide in telescoping relationship. Conventional seals 24 and 25 are provided between the hubs and primary pistons. It should be noted here that chambers 20a and 21a are not completely sealed against fluid leakage because fluid can slowly leak past seals 22, 24, and 23, 25, for purposes that will hereinafter appear.

The primary pistons 20 and 21 also include radially outward extending flanges 20b and 21b which are resiliently held against their adjacent large pistons or against their respective shoulders 17, 18 on the shaft by means of the conventional disengaging springs 26 and 27. These springs are held at one end by the retaining rings 28 and are seated at their other ends in pockets 29, 30 in the clutch hubs 31, 32, respectively. It will be noted that the central portion of these pistons is of considerable axial length which provide a good bearing surface on the shaft and prevent tilting or wobbling of the pistons. The relatively narrow, radially extending flanges 20b and 21b are undercut at 33, and the resulting tapered flanges with a radially outer contact point 34 provide maximum deflection for constant stress. The advantage of this particular construction will appear later.

With the above arrangement, the clutch disengaging springs bias both primary pistons against their locating shoulders 17, 18, respectively, on the shaft 1, and the balanced force piston 7 is located between the two primary pistons.

THE CLUTCHES

Clutches 35, 36 are located on opposite sides of the main force piston 7 and are similar to one another and conventional in nature, having interleaved friction discs 37, 38 splined, respectively, to their hubs 31, 32 and to their drums 39, 40. Hubs 31 and 32 are connected to shaft 1 by the spline connections 41 and 42 for rotation with the shaft. Drums 39 and 40 are rigidly secured to elements to be selectively driven, such as gears 44 and 45 which may be journalled on shaft 1 and connected with other elements to be driven.

FLUID PASSAGES AND VALVES

Hydraulic fluid is introduced into the various chambers in the following manner, and the operation will be explained in connection with the right-hand clutch, it being understood that the operation of the other clutch is similar.

FIGURE 2 shows the neutral or disengaged position of the clutch. The large chambers C1, C2 and small chambers 20a, and 21a are kept filled with fluid and purged of air by admitting fluid at lube pressure from the lube passage 50 in the shaft 1, through the one-way check ball valves 51 and 52 in cross ports 53, 54 and into the annular grooves 55 and 56 which are formed in the hubs 8a and 9a, respectively.

Also formed in the hubs 8a and 9a of the force piston are a series of axial fluid feed means in the form of holes 58 which place grooves 55, 56 in communication with their respective small chambers 20a and 21a. Fluid pushes the valve plates 60, 61 off their holes 58, and the fluid moves into the primary piston chambers. The valve plates 60 and 61 are of flat, ring-like construction and are held in relatively loosely assembled relationship on the hubs by means of the snap rings 63. These plates function as one-way valves and prevent flow from chambers 20a, 21a back to their respective annular grooves 55, 56.

Another series of axial fluid feed means are provided in the form of holes 65 which are also located in hubs 8a and 9a and place the annular grooves 55, 56 in fluid communication with, respectively, the large chambers C1 and C2.

It should be noted that the number, say for example 12, of axial feed holes 58 leading to the primary piston chambers 20a and 21a is greater than the number, say for Example 3, of axial feed holes 65 which lead to the main chambers C1 and C2; that is to say, the total cross sectional area of the holes 58 is greater than that of holes 65. This provides greater restriction of fluid flow to the large chambers C1 and C2 than to the smaller primary piston chambers.

Lubricating fluid is furnished to the clutch plates from passage 50 via cross ports 50a and 50b.

As the clutch is shown in FIGURE 2, no appreciable static pressure is built up in the actuating chambers since the lube fluid is orificed through the small feed holes into the chambers and vented to exhaust through passages 75, 74, and 71, 70 which are vented to atmosphere in the neutral condition.

With the above arrangement, both the small, primary piston chambers and the large, force piston chambers are maintained full of fluid from the lube fluid passage. The one-way check valves prevent return flow of fluid, and the fluid is not transferred back and forth from one side to the other. Furthermore, the above fluid passages in the hubs of the main piston cause the clutch apply fluid pressure to enter the small chamber and pressurize it before the adjacent large chamber in the main piston is pressurized. By this means, the small piston is first urged into contact with the clutch plates and running clearance thus taken up in the clutch before the main piston applies pressure. This action contributes to a smooth operation, as will now be more fully described.

Higher pressure fluid is furnished to actuate the clutches 35 and 36 through their respective shaft passage 74, 75, and 70, 71. That is to say, clutch apply pressure fluid is admitted selectively to either passage 70 or 74 by control valves (not shown).

OPERATION

FIGURE 3 shows the beginning of the clutch actuation, more specifically when the right-hand clutch (as viewed in the drawings) is actuated. Pressure fluid is directed through fluid passage 70 in the shaft, through cross port 71, and into the annular groove 56. Because of the above-mentioned lesser amount of fluid flow restriction to the primary piston chamber 21a, the fluid first moves the primary piston 21 to the right and into engagement with the clutch plates. The pressure fluid has also forced the check ball 52 in the lube fill port 54 to the checking position, and some pressure fluid, of course, has also entered the main chamber C2.

Referring now to FIGURE 4, after the primary piston 21 has moved into engagement with its clutch pack, no additional fluid can flow into chamber 21a. At this time, the slightest continued movement of the main force piston to the right (as viewed in FIGURE 4) causes the plate check valve 61 to seal against the axial feed holes 58, thereby causing a hydraulic lock in chamber 21a. As a result, the entire piston assembly functions as an integral unit, and clutch apply pressure fluid acting on the total area of the main force piston develops full apply force on the clutch pack.

As previously mentioned, however, the primary piston chamber 21a is not sealed completely against leakage, and as a result, fluid can slowly bleed from the small chamber, and the main force piston can move slowly until it finally abuts against the primary piston 21, as shown in FIGURE 5. Now the force developed in the chamber C2 is applied directly to the clutch pack. While chamber C2 is being pressurized, chamber C1 is opened via its passages 74 and 75 to permit it to contract, but still remain full.

As previously mentioned, due to the shape and construction of the primary pistons, the radially extending tapered flanges 20b and 21b, having a point of contact with the main piston adjacent their periphery, are capable of deflecting a maximum amount with constant stress and thereby provide a gradual build-up of the engaging force as they initially contact their clutch pack, which contributes to smooth clutch engagement.

FIGURE 6 MODIFICATION

Figure 6:
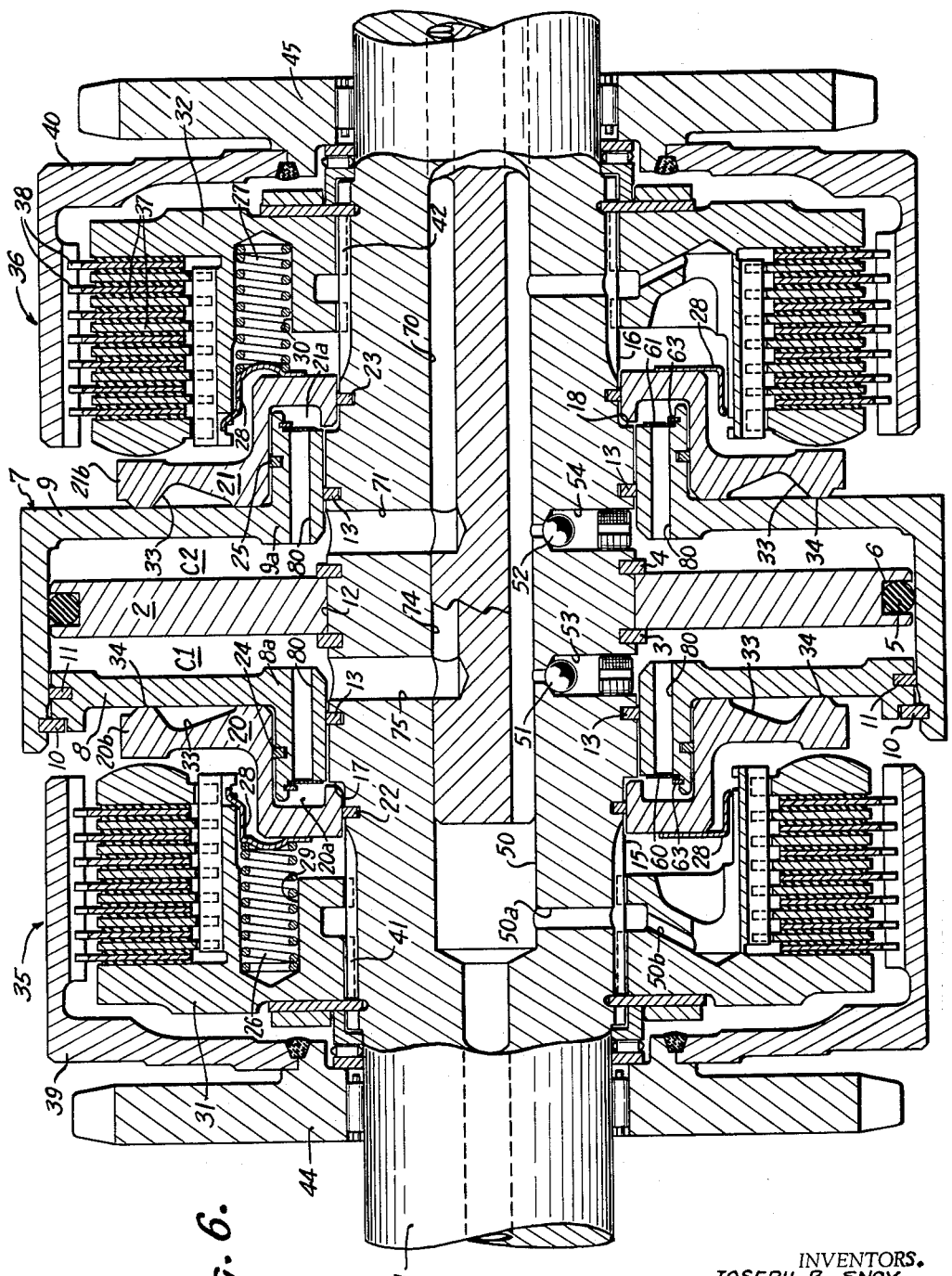
FIGURE 6 is a fragmentary view of a modified form of the mechanism shown in FIGURE 1.
Figure 7:
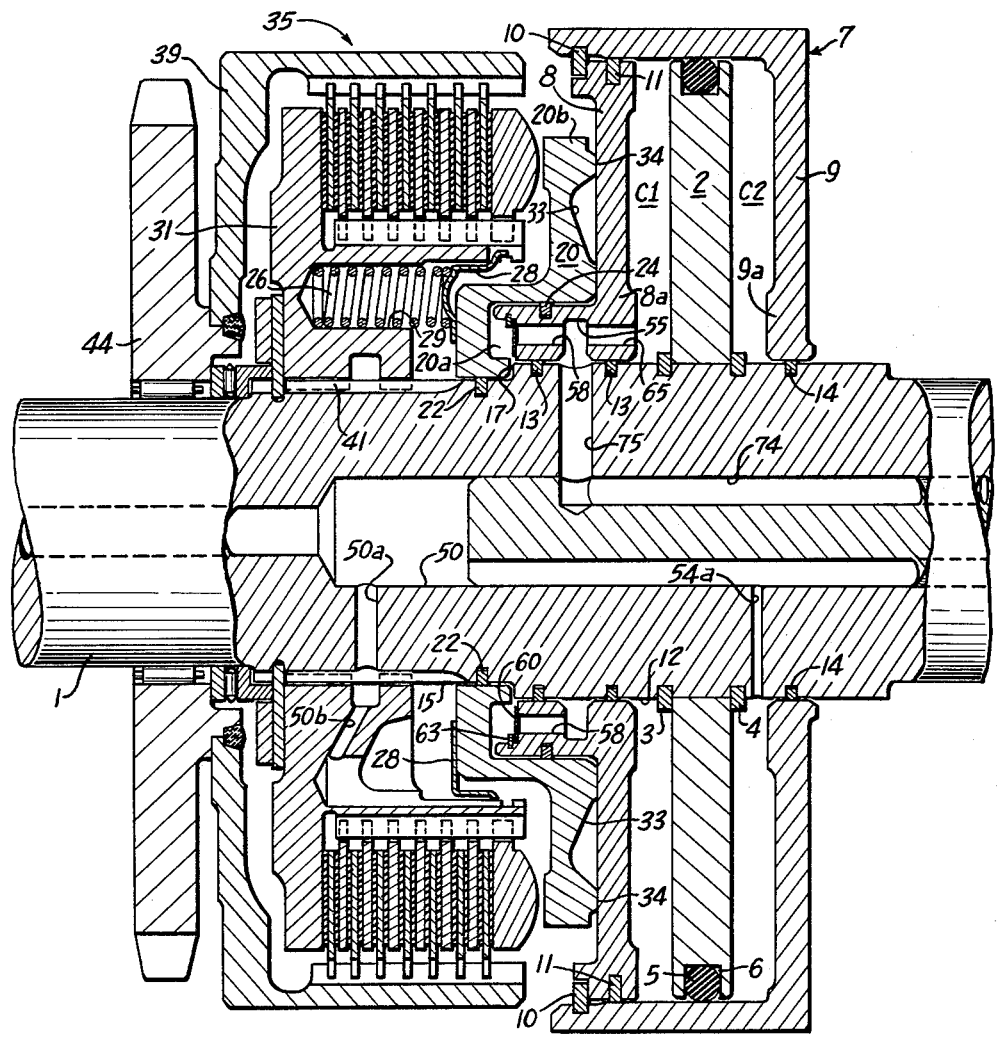
FIGURE 7 is a view similar to FIGURE 1 but showing a modified form of the invention.

FIGURE 6 shows a modified form of the invention which has a different fluid passage arrangement in the main piston than the device of FIGURE 1. Parts of similar construction in FIGURES 1 and 6 have been similarly numbered, and further reference to them is not believed to be necessary or desirable.

In this modification, the high pressure fluid supply passages 75 and 71 extend directly in fluid delivering communication with the main chambers C1 and C2, respectively, as do the lubricating fluid passages 53 and 54 and their check valves 51 and 52.

The fluid passages in the hubs of the main piston take the form of a series of holes 80 which extend straight through the hubs in an axial direction and place the main chambers in communication with their respective small chambers, via the plate-type check valves 60, 61.

Assume the clutch is in the neutral position, as shown in FIGURE 6, where the springs 26 and 27 hold the small pistons against their respective shaft shoulders 17 and 18. Assume further that the right-hand clutch (as viewed in FIGURE 6) is to be engaged.

With the above fluid passage ararngement, the fluid first enters the main chamber C2 and then flows into the adjacent small chamber 21a via holes 80.

Chamber 21a and chamber C2 are both filled with fluid and the entire piston assembly works as a single unit to compress the pack. The small piston has not acted first to compress the stack, and the operation is somewhat slower than the FIGURE 1 device, in that situation.

The opposite small piston 20 has been held against its shaft shoulder 17 and has not had to travel to the right as far as the main piston has had to go in order to actuate the right-hand clutch.

When the opposite clutch is now to be engaged, that is, when the piston must travel all the way across neutral, this modification does provide a fast operation as follows.

Chamber 20a has been maintained full of fluid as has chamber C1. Now when the main chamber C1 is pressurized, the main piston begins to move to the left, causing valve 60 to close, thus forming a hydraulic lock in chamber 20a. As a result, the main piston 7 and the small piston 20 move as a unit, and piston 20 only must move a relatively short distance, from its shaft shoulder 17, in order to begin compressing its clutch pack. As a result, the previously mentioned smooth or soft clutch engagement takes place. The small piston deflects as it continues to apply forces to the clutch pack, and then after fluid has leaked sufficiently from chamber 20a, the main piston abuts against the small piston 20 to then apply clamping force directly through the small piston.

FIGURE 7

This figure shows the invention as applied to a single clutch, and parts similar to those of FIGURE 1 have been similarly numbered.

It will be noted that the main piston 7 has only one hub 8a. Furthermore, the check valves 51 and 52 as in FIGURE 1 are not required. In this modification, a passage 54a is provided from the lube passage 50 to the chamber C2 so as to maintain chamber C2 full of fluid from the lube passage, and thus balance the centrifugal force in chamber C1 due to the fluid therein.

The operation of the single clutch mechanism is generally the same as the dual clutch mechanisms in respect to maintaining the large chambers full and providing quick action of the clutch.

RÉSUMÉ

With the clutch mechanism provided by the present invention, no transfer of oil between the main actuating chambers C1 and C2 is necessary, and a considerable number of complicated and expensive parts are not required as they were in certain of the prior art devices. Nevertheless, the volume of fluid required is held to a minimum, and fast action is not sacrificed.

The shape of the primary pistons permits maximum deflection thereof when urged against their respective clutch, thereby contributing to "soft" clutch engagement.

The axially long hub of the small piston results in a stable mounting for the pistons on the shaft and on the spaced side walls of the main annular piston, so as to preclude tipping of the entire piston in an axial direction.

All of the chambers are positively maintained full of fluid, in dual clutch arrangement by the check valve controlled lubricating fluid passage, and no appreciable static pressure is built up in the actuating chambers.

The present clutch mechanism is fast in operation, more economical to manufacture, more reliable in operation, and has smooth operating characteristics.

Various modes of carrying out the invention are contemplated as being within the scope of the following claims particularly pointing out and distinctly claiming the subjected matter which is regarded as the invention.

1. A hydraulically operated clutch mechanism comprising a pair of clutches having a common shaft, a main force piston shiftable on the shaft between said clutches, said piston being hollow and of annular shape and having a pair of axially spaced apart end walls, and an axially extended and annular hub in the center of each of said end walls for mounting said main piston on said shaft, an annular reaction member within said force piston and fixed on said shaft to define a pair of large variable volume, pressure fluid chambers, a pair of primary pistons mounted on said shaft outside of said main piston and one on each side of said main piston and slidably engageable therewith to define a pair of small variable volume chambers, said primary pistons being engageable with their respective clutches to cause actuation thereof, and means for constantly supplying fluid at a relatively low pressure to said large and small chambers when both clutches are released including passage means in said hubs and extending axially to communicate with the large and small chambers adjacent thereto.

2. The mechanism as set forth in claim 1 wherein said supply passages comprise, an annular groove in said hubs and axial fluid feed means extending from said groove to said large chamber and also from said groove to said small chamber, the axial fluid feed means to said small chamber being of greater total cross sectional area than that of said axial fluid feed means which extend to said large chamber.

3. In a hydraulically operated clutch mechanism of the type having a pair of clutches having a common shaft, a main force piston shiftable on the shaft between said clutches, said piston being hollow and of annular shape and having a pair of axially spaced apart end walls, and an axially extending and annular hub in the center of each of said end walls for mounting said main piston on said shaft, an annular reaction member within said force piston and fixed on said shaft to define a pair of large variable volume, pressure fluid chambers; the improvement comprising a pair of primary pistons mounted on said shaft outside of said main piston and one on each side of said main piston and slidably engageable therewith to define a pair of small variable volume chambers, said primary pistons being engageable with their respective clutches to cause actuation thereof, means for constantly supplying fluid at a relatively low pressure to said large and small chambers when both clutches are released including passage means in said hubs and extending axially to communicate with the large and small chambers adjacent thereto, and one-way check valve means adjacent said small chambers to prevent return of fluid therefrom and cause a substantial hydraulic lock in a small chamber when said main piston moves toward it.

4. The mechanism as set forth in claim 3 wherein said supply passages comprise, an annular groove in said hubs and axial fluid feed means extending from said groove to said large chamber and also from said groove to said small chamber, the axial fluid feed means to said small chamber being of greater total cross sectional area than that of said axial fluid feed means which extend to said large chamber.

5. A hydraulically operated clutch mechanism comprising a pair of clutches having a common shaft, a main force piston shiftable on the shaft between said clutches, an annular reaction member within said force piston and fixed on said shaft to define a pair of large variable volume, pressure fluid chambers, a pair of primary pistons slidably mounted on said shaft and outside of said main piston and one on each side of said main piston and slidably engageable therewith to define a pair of small variable volume chambers, said primary pistons being engageable with their respective clutches to cause actuation thereof, said primary pistons having a central opening for mounting said primary pistons on said shaft, said primary pistons each also having a radially extending flange which is relatively narrow in an axial dimension so as to deflect axially upon engaging its respective clutch, and passage means in said main piston for constantly supplying fluid to said large and small chambers.

6. The mechanism as set forth in claim 5 wherein said main force piston has a pair of hubs by which it is mounted on said shaft, and said passage means comprises, an annular groove in said hub and axial fluid feed means extending from said groove to said large chamber and also from said groove to said small chamber, the fluid feed means to said small chamber being of greater total cross sectional area than that of said fluid feed means which extend to said large chamber.

7. A hydraulically operated clutch mechanism comprising a pair of clutches having a common shaft, a main force piston shiftable on the shaft between said clutches, said piston being hollow and of annular shape and having a pair of axially spaced apart end walls, and an axially extending and annular hub in the center of each of said end walls for mounting said main piston on said shaft, an annular reaction member within said force piston and fixed on said shaft to define a pair of large variable volume, pressure fluid chambers, a pair of primary pistons mounted on said shaft outside of said main piston and one on each side of said main piston and slidably engageable therewith to define a pair of small variable volume chambers, said primary pistons being engageable with their respective clutches to cause actuation thereof, said small pistons having a central opening for mounting said small pistons on said shaft, said small pistons each also having a radially extending flange which is relatively narrow in an axial dimension so as to deflect axially upon engaging its respective clutch, and means for constantly supplying fluid at a relatively low pressure to said large and small chambers when both clutches are released including passage means in said hubs and extending axially to communicate with the large and small chambers adjacent thereto.

8. The mechanism as set forth in claim 7 wherein said supply passages comprise, an annular groove in said hubs and axial fluid feed means extending from said groove to said large chamber and also from said groove to said small chamber, the fluid feed means to said small chamber being of greater total cross sectional area than that of said fluid feed means which extend to said large chamber.

9. A hydraulically operated clutch mechanism comprising a pair of clutches having a common shaft, a main force piston shiftable on the shaft between said clutches, an annular reaction member within said force piston and fixed on said shaft to define a pair of large variable volume, pressure fluid chambers, a pair of primary pistons mounted on said shaft outside of said main piston and one on each side of said main piston and slidably engageable therewith to define a pair of small variable volume chambers, said primary pistons being engageable with their respective clutches, means for constantly supplying fluid at a relatively low pressure to said large and small chambers when both clutches are released including passage means in said main piston and one-way check valve means to prevent return flow of said low pressure fluid, and means for supplying clutch apply pressure fluid to said chambers to first cause said primary piston to take up the clutch running clearance and then cause said main piston to abut against one of the primary pistons and apply clamping force on said clutch.

10. A hydraulically operated clutch mechanism comprising a pair of clutches having a common shaft, a main force piston shiftable on the shaft between said clutches, an annular reaction member within said force piston and fixed on said shaft to define a pair of large variable volume, pressure fluid chambers, a pair of primary pistons mounted on said shaft outside of said main piston and one on each side of said main piston and slidably engageable therewith to define a pair of small variable volume chambers, each of said primary pistons being engageable with its respective clutch; means for constantly supplying fluid at a relatively low pressure to said large and small chambers when both clutches are released including passage means in said main piston, a low pressure fluid passage in said shaft and in communication with said passage means, and one-way check valve means to prevent return flow of said low pressure fluid; and high pressure fluid passages in said shaft for supplying clutch apply pressure fluid via said passage means to said chambers to first cause one of said primary pistons to take up the clutch running clearance of its clutch and then cause said main piston to abut against said primary piston and apply clamping force on said clutch.

11. Mechanism as defined in claim 10 including one-way check valve means adjacent said small chambers to prevent return of fluid therefrom and cause a substantial hydraulic lock in a small chamber when said main piston moves toward it.

12. A hydraulically operated clutch mechanism comprising a clutch mounted on a shaft, a main force piston shiftable on the shaft, said piston being hollow and of annular shape and having a pair of axially spaced apart end walls, and an axially extending and annular hub in the center of one of said end walls for mounting said main piston on said shaft, an annular reaction member within said force piston and fixed on said shaft to define a pair of large variable volume, pressure fluid chambers, a primary piston mounted on said shaft outside of said main piston and on one side of said main piston and slidably engageable therewith to define a small variable volume chamber, said primary piston being engageable with said clutch to cause actuation thereof, and means for constantly supplying fluid at a relatively low pressure to said large and small chambers when said clutch is released including passage means in said hub and extending axially to communicate with the large and small chambers adjacent thereto.

13. The mechanism as set forth in claim 12 wherein said supply passages comprise, an annular groove in said hub and axial fluid feed means extending from said groove to said large chamber and also from said groove to said small chamber, the feed means to said small chamber being of greater total cross sectional area than that of the feed means which extend to said large chamber.

14. In a hydraulically operated clutch mechanism of the type having a clutch on a shaft, a main force piston shiftable on the shaft, said piston being hollow and of annular shape and having a pair of axially spaced apart end walls, and an axially extending and annular hub in the center of one of said end walls for mounting said main piston on said shaft, an annular reaction member within said force piston and fixed on said shaft to define a pair of large variable volume, pressure fluid chambers; the improvement comprising a primary piston mounted on said shaft outside of said main piston and at one side of said main piston and slidably engageable therewith to define a small variable volume chamber, said primary piston being engageable with said clutch to cause actuation thereof, means for constantly supplying fluid at a relatively low pressure to said large and small chambers when said clutch is released including passage means in said hub and extending axially to communicate with the large and small chambers adjacent thereto, and one-way check valve means adjacent said small chamber to prevent return of fluid therefrom and cause a substantial hydraulic lock in a small chamber when said main piston moves toward it.

15. The mechanism as set forth in claim 14 wherein said supply passages comprise, an annular groove in said hub and axial fluid feed means extending from said groove to said large chamber and also from said groove to said small chamber, the feed means to said small chamber being of greater total cross sectional area than that of said feed means which extend to said large chamber.

16. A hydraulically operated clutch mechanism comprising a clutch having a shaft, a main force piston shiftable on the shaft, an annular reaction member within said force piston and fixed on said shaft to define a pair of large variable volume, pressure fluid chambers, a primary piston slidably mounted on said shaft and outside of said main piston and at one side of said main piston and slidably engageable therewith to define a small variable volume chamber, said primary piston being engageable with said clutch to cause actuation thereof, said primary piston having a central opening for mounting said primary piston on said shaft, said primary piston also having a radially extending flange which is relatively narrow in an axial dimension so as to deflect axially upon engaging its clutch, and passage means in said main piston for constantly supplying fluid to said large and small chambers.

17. The mechanism as set forth in claim 16 wherein said main force piston has a hub by which it is mounted on said shaft, and said passage means comprises, an annular groove in said hub and axial fluid feed means extending from said groove to said large chamber and also from said groove to said small chamber, the feed means to said small chamber being of greater total cross sectional area than that of said feed means which extend to said large chamber.

18. A hydraulically operated clutch mechanism comprising a clutch mounted on a shaft, a main force piston shiftable on the shaft, said piston being hollow and of annular shape and having a pair of axially spaced apart end walls, and an axially extending and annular hub in the center of one of said end walls for mounting said main piston on said shaft, an annular reaction member within said force piston and fixed on said shaft to define a pair of large variable volume, pressure fluid chambers, a primary piston mounted on said shaft outside of said main piston and on one side of said main piston and slidably engageable therewith to define a small variable volume chamber, said primary piston being engageable with said clutch to cause actuation thereof, said small piston having a central opening for mounting it on said shaft, said small piston also having a radially extending flange which is relatively narrow in an axial dimension so as to deflect axially upon engaging its clutch, and means for constantly supplying fluid at a relatively low pressure to said large and small chambers when said clutch is released including passage means in said hub and extending axially to communicate with the large and small chambers adjacent thereto.

19. The mechanism as set forth in claim 18 wherein said supply passages comprise, an annular groove in said hub and axial fluid feed means extending from said groove to said large chamber and also from said groove to said small chamber, the feed means to said small chamber being of greater total cross sectional area than that of said feed means which extend to said large chamber.

References Cited by the Examiner

UNITED STATES PATENTS

| | | | |
|---|---|---|---|
| 2,386,220 | 10/1945 | Lawler et al. | 192—109 |
| 2,638,750 | 5/1953 | Hettinger et al. | 188—196 X |
| 3,199,648 | 8/1965 | Schwab | 192—109 X |

FOREIGN PATENTS 979,874  12/1950  France.

DAVID J. WILLIAMOWSKY, *Primary Examiner.*

DON A. WAITE, *Examiner.*

B. W. WYCHE, *Assistant Examiner.*